United States Patent
Sommen

(10) Patent No.: US 11,400,461 B2
(45) Date of Patent: Aug. 2, 2022

(54) DEVICE FOR ELECTROSTATIC CHARGING OF A MIXTURE OF GRANULES, ASSOCIATED METHOD AND USE

(71) Applicant: Skytech, Bonnieres-sur-Seine (FR)

(72) Inventor: Pierre Sommen, Pacy-sur-Eure (FR)

(73) Assignee: SKYTECH, Bonnieres-sur-Seine (FR)

(*) Notice: Subject to any disclaimer, the term of this patent is extended or adjusted under 35 U.S.C. 154(b) by 0 days.

(21) Appl. No.: 17/030,788

(22) Filed: Sep. 24, 2020

(65) Prior Publication Data

US 2021/0094047 A1    Apr. 1, 2021

(30) Foreign Application Priority Data

Sep. 26, 2019    (FR) ...................... 19 10626

(51) Int. Cl.
*B03C 7/12*    (2006.01)
*B03C 7/00*    (2006.01)

(52) U.S. Cl.
CPC ............... *B03C 7/006* (2013.01); *B03C 7/12* (2013.01)

(58) Field of Classification Search
CPC ............ B03C 7/12; B03C 7/10; B03C 7/006
See application file for complete search history.

(56) References Cited

U.S. PATENT DOCUMENTS

| | | | | |
|---|---|---|---|---|
| 4,627,579 A | * | 12/1986 | Rich | C10L 9/00 209/129 |
| 5,855,330 A | * | 1/1999 | Kobayashi | A01K 89/015 242/261 |
| 5,885,330 A | | 3/1999 | Lee | |
| 6,034,342 A | * | 3/2000 | Schmoutziguer | B29B 17/02 209/127.1 |

FOREIGN PATENT DOCUMENTS

| | | | |
|---|---|---|---|
| CN | 103736593 A | * | 4/2014 |
| WO | 9845657 A1 | | 10/1998 |
| WO | 2015097290 A1 | | 7/2015 |
| WO | 2019171011 A1 | | 9/2019 |

OTHER PUBLICATIONS

Iuga, Alexandru, et al: "Tribocharging of plastics granulates in a fluidized bed device", Journal of Electrostatics 2005; 63(6-10):937-942. (Year: 2005).*
French Search Report for FR 19 10626 dated May 28, 2020.
Iuga, Alexandru, et al.; "Tribocharging of plastics granulates in a fluidized bed device"; Journal of Electrostatics 2005; 63(6-10):937-942.

* cited by examiner

*Primary Examiner* — Patrick H Mackey
(74) *Attorney, Agent, or Firm* — Duane Morris LLP

(57) ABSTRACT

A device for triboelectric charging of a mixture of granules of different materials, the device having a charging chamber with walls delimiting an inner space. The walls define a granule inlet and a granule outlet, the granule inlet and the granule outlet being separated from one another relative to an elevation direction. A blowing device is arranged suitable for generating, in the inner space, an air flow suitable for allowing the granules in the chamber to form a fluidized bed, and a plurality of grids are positioned in the chamber, the grids being suitable for blocking the passage of the granules, the grids forming a set of baffles in the inner space between the granule inlet and the granule outlet.

12 Claims, 3 Drawing Sheets

DEVICE FOR ELECTROSTATIC CHARGING OF A MIXTURE OF GRANULES, ASSOCIATED METHOD AND USE

RELATED APPLICATIONS

The present application claims priority benefit of French Application No. FR 19 10626 filed on Sep. 26, 2019, the contents of which are hereby incorporated by reference in its entirety.

FIELD OF THE INVENTION

The present invention relates to a device for electrostatic charging of a mixture of granules of different materials. The invention also relates to a charging method implementing the preceding device, as well as a use of the device for charging a mixture.

BACKGROUND OF THE INVENTION

Electrostatic separation devices are already used to sort mixed granular materials, for example coming from the shredding of industrial waste. Generally, the majority of the materials to be separated consists of electrically insulating materials, and in particular plastic materials.

For example, the recycling of electrical and/or electronic waste involves separating the various components before leveraging the obtained materials. It is desirable for such a separation to be as efficient as possible in order to obtain a substantially constant quality of the recycled materials.

When the materials to be separated have equal or very close densities, separation methods based on gravity are too imprecise and do not make it possible to obtain satisfactory separations.

To that end, techniques are known consisting of shredding the insulating materials to turn them into granules and separate them by electrostatic effect.

In a first step, the granules are charged by triboelectric effect in a charging device.

In order to charge particles by triboelectricity, it is known to use agitation methods, causing the granules of a mixture to be separated to collide. This allows the particles of a first material to be negatively charged and the particles of a second material to be positively charged, allowing their separation.

In a second step, the charged granules are conveyed toward an electrostatic sorting device, in which they are separated by an electric field.

The quality of the separation of the granules depends on the ratio between the force applied by the electric field and that resulting from gravity. Thus, it is desirable to maximize the charge applied to the granules before they are introduced into the separating device, in order to increase the deflection effect of the electric field.

One known type of charging device is that of triboelectric devices using air as agitating means, in particular fluidized bed devices.

Using an air flow as agitating means is advantageous because it makes it possible to dry and lightly heat the granules via the air flow in addition to agitating them. Charging by triboelectric effect is in fact more effective with a low moisture level and a high temperature.

Such a charging device using the air as agitation means, also called fluidized bed devices, is described by document JP 10024252.

This device is not fully satisfactory. Indeed, it only allows the charging of lots of granules, and not the charging of a constant stream of granules, which is most interesting for industrial exploitation.

Additionally, it has been demonstrated that the residence time of the granules in the charging device is an important parameter to maximize the surface charges generated on the granules.

In particular, a maximum charge value of the granules is reached past a certain residence time depending on the device and the materials of the granules. This maximum charging time is a priori greater than 2 minutes, or may even reach at least ten minutes in some cases.

The residence times of the granules in the known devices of the state of the art are generally of the order of 30 seconds, that is to say well below the aforementioned optimal values.

SUMMARY OF THE INVENTION

There is therefore a need for a device for triboelectric charging of a mixture of granules on a fluidized bed, allowing the charging of a continuous stream of granules with an increased residence time, without significantly increasing the space requirement associated with the device.

To that end, the invention relates to a device for triboelectric charging of a mixture of granules of different materials, the device comprising:
- a charging chamber comprising walls delimiting an inner space, the walls defining a granule inlet and a granule outlet, the granule inlet and the granule outlet being separated from one another relative to an elevation direction,
- a blowing device suitable for generating, in the inner space, an air flow suitable for allowing the granules in the chamber to form a fluidized bed, and
- a plurality of grids positioned in the chamber, the grids being suitable for blocking the passage of the granules, the grids forming a set of baffles in the inner space between the granule inlet and the granule outlet.

According to specific embodiments, the charging device comprises one or more of the following features, considered alone or according to any technically possible combination:
- each grid extends in a plane of extension and has a rectangular shape;
- the plane of extension of each grid forms an incline angle with the elevation direction, a value of the incline angle being inclusively between −20° and 20°;
- the value of the incline angle of each grid is opposite the value of the incline angle of each adjacent grid;
- at least one covering of the walls of the chamber is made with a covering material, the covering material being suitable for charging at least two of the materials of the granules by triboelectric effect;
- each grid defines a passage in the inner space, each passage being suitable for allowing the passage of the granules, each passage opening near a lateral edge of the chamber, and
- each grid extends through the entire inner space, the chamber comprising ducts passing through the walls, each duct being suitable for allowing the granules to bypass one of the grids.

The invention also relates to a method for triboelectric charging of a mixture of granules of different materials, the method implementing a device for charging a mixture of granules of different materials, the device comprising:
- a charging chamber comprising walls delimiting an inner space, the walls defining a granule inlet and a granule outlet, the granule inlet and the granule outlet being separated from one another relative to an elevation direction, a blowing device suitable for generating, in the inner space, an air flow flowing in the elevation direction, the air flow being suitable for allowing the granules in the chamber to form a fluidized bed, and a plurality of grids positioned in the chamber, the grids being suitable for blocking the passage of the granules, the grids forming a set of baffles in the inner space between the granule inlet and the granule outlet, the method comprising the following steps:

generating the air flow in the inner space via the blowing device, inserting granules in the chamber through the granule inlet, having the granules travel through the chamber, in order to obtain charged granules, and extracting the charged granules from the chamber through the granule outlet.

According to one specific embodiment, the method according to the invention comprises the following feature:

during the travel step, an average residence time of the granules in the chamber is greater than or equal to thirty seconds, in particular greater than or equal to one minute, advantageously greater than or equal to two minutes.

The invention further relates to a use of a device for triboelectric charging of a mixture of granules of different materials in order to charge the granules, so as to separate granules based on the materials of the granules, the device comprising:

a charging chamber comprising walls delimiting an inner space, the walls defining a granule inlet and a granule outlet, the granule inlet and the granule outlet being separated from one another relative to an elevation direction, a blowing device suitable for generating, in the inner space, an air flow flowing in the elevation direction, the air flow being suitable for allowing the granules in the chamber to form a fluidized bed, and a plurality of grids positioned in the chamber, the grids being suitable for blocking the passage of the granules, the grids forming a set of baffles in the inner space between the granule inlet and the granule outlet, the materials of the granules being chosen from the group consisting of polypropylene, polystyrene, polyamide, acrylonitrile butadiene styrene and polyethylene.

BRIEF DESCRIPTION OF THE DRAWINGS

The invention will be better understood upon reading the following description, provided solely as an example and done in reference to the appended drawings, in which.

DETAILED DESCRIPTION OF THE DRAWINGS

Figure 1:
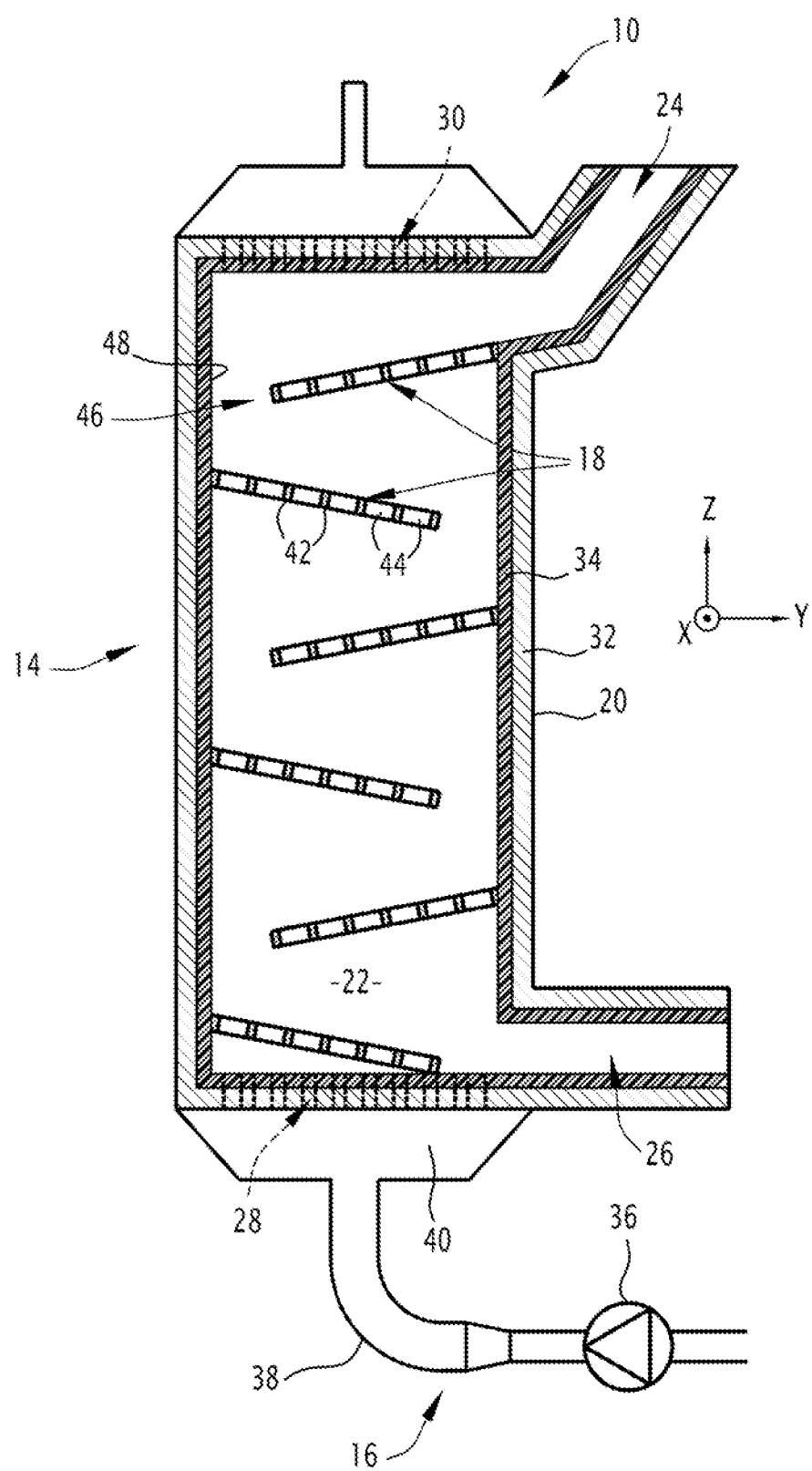
FIG. 1 is a sectional view of a first exemplary charging device.
Figure 2:
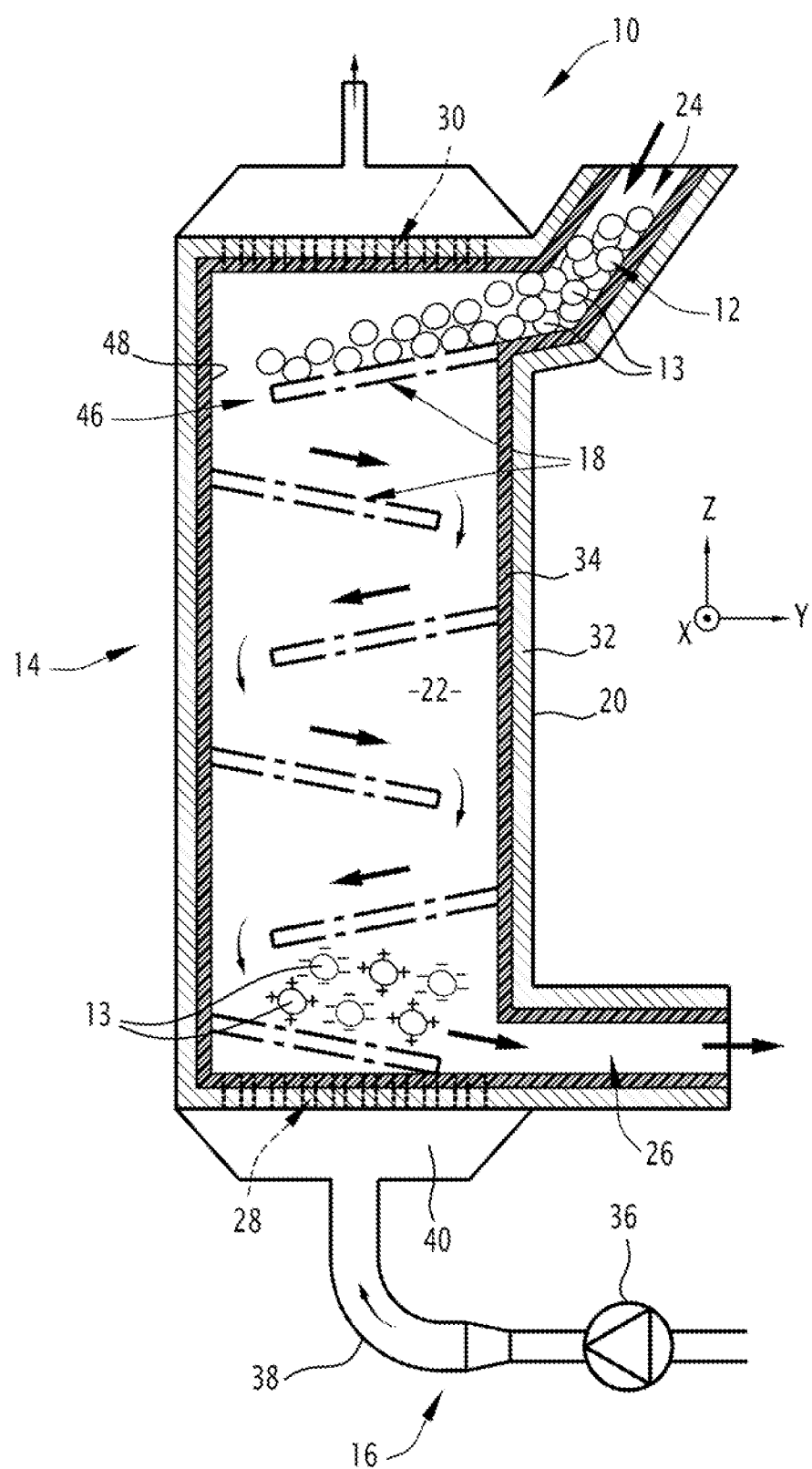
FIG. 2 is a sectional view of the device of FIG. 1 during the implementation of a charging method of a mixture of granules.

A charging device 10 is shown in FIGS. 1 and 2.

The device 10 is suitable for charging a mixture 12 of granules 13 by triboelectric effect.

"Granule" refers to a particle having a substantially compact shape, made up of at least one material. A granule has millimetric characteristic dimensions. For example, each granule 13 has dimensions, measured along each of the directions, inclusively between 1 millimeter and 20 millimeters.

The mixture 12 in particular comprises granules 13 of varied shapes and varied sizes, for example with a normal size distribution having a center located in the value range of sizes previously mentioned.

"Granules of at least two different materials" means that the mixture 12 for example comprises at least a first population of granules 13 primarily comprising a first material and a second population of granules 13 primarily comprising a second material, the second material being different from the first material.

"Primarily" means that each granule 13 of the first population for example comprises at least 90% by weight of the first material or that each granule 13 of the second population comprises at least 90% by weight of the second material.

According to the proposed example, the first material and the second material are electrically insulating materials, in particular plastic materials.

For example, the first material and the second material are chosen from the group consisting of polypropylene, polystyrene, polyamide, acrylonitrile butadiene styrene and polyethylene.

The mixture 12 of granules 13 is for example obtained by shredding, in particular waste, more specifically industrial waste, from electric and/or electronic equipment or from decommissioned vehicles.

"Charging the granules" means that the charging device 10 is suitable for generating electric surface charges on an outer surface of at least part of the granules 13, owing to the triboelectricity phenomenon.

Triboelectricity is a phenomenon occurring during friction of surfaces of two different insulating materials, during which electron transfers occur from one of the surfaces toward the other, which causes the appearance of charges of surfaces of opposite signs on the two surfaces.

The device 10 is described in reference to an elevation direction Z, oriented according to gravity, as well as a longitudinal direction X and a transverse direction Y that are perpendicular to one another and to the elevation direction Z.

"Above" and "below" mean that one object is located higher than another, respectively lower than another, relative to the elevation direction Z.

The device 10 comprises a charging chamber 14, a blowing device 16 and a plurality of grids 18.

According to the illustrated example, the charging device 10 comprises eight grids 18.

More generally, the device 10 comprises at least four grids 18, in particular at least twelve grids 18.

The presence of a larger number of grids in the chamber makes it possible to further increase the residence time of the granules 13 in the charging device 10, without modifying its footprint.

The charging chamber 14 is a compartment suitable for containing and isolating the mixture 12 during the charging of the granules 13.

In particular, the chamber 14 is suitable for protecting the mixture 12 of granules 13 from variations in temperature, pressure, humidity and electric field outside the chamber 14, during the charging.

The charging chamber 14 comprises walls 20, which delimit an inner space 22 and define a granule inlet 24 and a granule outlet 26 as well as an air inlet 28 and an air outlet 30.

The charging chamber 14 has a parallelepipedic shape, elongated along the elevation direction Z.

The chamber 14 has a length, measured in the longitudinal direction X, a width measured in the transverse direction Y, and a height measured in the elevation direction Z.

The length and the width of the chamber 14 are for example inclusively between 40 centimeters and 60 centimeters.

The height of the chamber 14 is for example inclusively between 80 centimeters and 120 centimeters.

The area of a horizontal section, in a plane XY orthogonal to the elevation direction Z, of the chamber 14 is representative of a footprint of the device 10.

The area of the section of the chamber 14 in the horizontal plane is advantageously smaller than 4000 square centimeters.

This allows the device 10 to have a small footprint.

The walls 20 are a set of plates forming an enclosure.

The walls 20 are for example made from a metal material.

In the illustrated example, the walls 20 comprise a structure 32 and a covering 34.

The structure 32 of the walls 20 is for example made with the metal material.

The covering 34 is a layer covering the structure 32 of the walls 20.

The covering 34 extends opposite the inner space 22.

In the illustrated example, the covering 34 is made from a covering material.

The covering material is an insulating plastic material, suitable for charging at least two of the materials of the granules 13 by triboelectric effect.

Using a covering material on an inner surface of the walls of the chamber makes it possible to generate charges by triboelectricity during collisions between the granules 13 and the walls 20.

This is in particular possible when the materials making up the granules 13 make it possible to choose a covering material able to charge the granules 13 with surface charges having different signs.

The granule inlet 24 is an opening in the walls 20 of the chamber 14, located above the grids 18.

The granule inlet 24 allows the insertion of the granules 13 in the inner space 22.

The granule outlet 26 is an opening in the walls 20 of the chamber 14, located below the grids 18.

The granule outlet 26 allows the extraction of the granules 13 from the inner space 22.

The granule outlet 26 is for example suitable for being connected to an electrostatic separating device (not shown).

The granule inlet 24 and the granule outlet 26 are separated from one another along the elevation direction Z.

The air inlet 28 is a distribution opening for an air flow in the inner space 22 of the chamber 14.

The air inlet 28 advantageously has a wire mesh, so as to prevent granules 13 from passing through the air inlet 28.

The air outlet 30 is an opening suitable for allowing the discharge of the air flow outside the chamber 14, so as to avoid an overpressure.

The air outlet 30 advantageously has a wire mesh, so as to prevent the passage of granules 13.

The blowing device 16 comprises a blower 36, an air intake duct 38 and an air divider 40.

The blowing device 16 is suitable for generating, in the chamber 14, an air flow flowing in the elevation direction Z.

The air flow is suitable for allowing the granules 13 in the chamber 14 to form a fluidized bed.

"Fluidized bed" refers to a state of a granular material imparting flow properties to it that are generally associated with liquids and gases, under the effect of an outside agitation.

This agitation is caused by injecting a pressurized fluid, here air, below the granular medium, here the mixture 12 of granules 13. The pressure exerted by the air flow counterbalances part of the action of the gravity on the granules 13.

The granules 13 are then driven by chaotic movements and collide frequently, favoring charging by triboelectricity.

Furthermore, this state allows the granules 13 to flow in the chamber 14.

The blower 36 is a propeller suitable for setting a gas in motion, in particular air in the described example.

The blower 36 for example comprises a helix set in motion by a thermal or electric motor.

The air intake duct 38 is a guide tube for the air set in motion by the blower 36.

The air inlet duct 38 is suitable for guiding the air from the blower 36 to the air divider 40.

The air divider 40 is a fluid device for distributing an entering air flow in order to form a homogeneous air flow on a predetermined outlet surface.

The air divider 40 is suitable for distributing the air circulating in the air inlet duct 38 in order to form an air flow having a homogeneous intensity over the entire section of the inner space 22.

The air divider 40 for example comprises a plurality of hoses.

The hoses emerge in the air inlet duct 38 at a first end and at the air inlet 28 at a second end.

The second ends of the hoses are distributed over the entire span of the air inlet 28, so as to form a homogeneous air flow over the entire section of the inner space 22.

For example, the second ends of the hoses are aligned along the longitudinal X and transverse Y directions, separated by regular intervals, over the entire length and the entire width of the air inlet 28.

This makes it possible to obtain an air flow having a substantially constant flow rate over the entire section of the chamber 14.

The grids 18 are for example plates pierced with holes.

Each grid 18 comprises a plurality of solid regions 42 and free regions 44 alternating over a span of the grid 18.

The free regions 44 are the holes in the plate and the solid regions 42 are unpierced parts of the plate.

The free regions 44 have transverse dimensions smaller than the dimensions of the granules 13.

"Transverse dimension" refers to a diameter of the holes.

Each grid 18 is thus suitable for blocking the passage of the granules 13 and for allowing the passage of the air flow.

Each grid 18 has a flat rectangular shape and extends in the inner space 22 in a plane of extension, through at least part of the air flow.

"Through at least part of the air flow" means that each grid 18 extends in a part of the inner space 22 in which the air flow is intended to flow, and the plane of extension of the grid 18 extends transversely to the direction of flow of the air flow.

The plane of extension of each grid 18 forms an incline angle with the elevation direction Z.

A value of the incline angle is for example inclusively between 0° and 20°.

The variation of the value of the angle between the grids and the elevation direction Z makes it possible to adjust the speed at which the granules 13 travel through the chamber.

Each grid 18 defines a passage 46 in the inner space 22.

The grids 18 are for example made from a rigid material.

The rigid material is chosen such that the grids 18 are not deformed by the air flow or the passage of the granules 13.

Advantageously, the rigid material is suitable for charging at least one of the materials of the granules 13 by triboelectric effect.

For example, the rigid material is polypropylene or polystyrene.

This is particularly suitable for charging a mixture 12 of granules 13 comprising polypropylene and/or polystyrene.

According to one embodiment, the rigid material is a composite material comprising at least two materials chosen from the materials making up the granules 13 of the mixture 12.

This allows the rigid material of the grids 18 to charge the granules 13 made up of each of the materials of the mixture 13.

According to one embodiment, the grids 18 are assemblies of bars.

In this case, the solid regions 42 are the bars and the free regions 44 are intervals separating the bars.

The transverse dimensions of the free regions 44 are then the distances separating two adjacent bars.

The passages 46 are openings in the grids 18.

The passages 46 have transverse dimensions larger than the dimensions of the granules 13.

Thus, the passages 46 are suitable for allowing the passage of the granules 13.

Each passage 46 opens in the vicinity of a lateral edge 48 of the chamber 14.

The passages 46 are offset from one grid 18 to the next along the elevation direction Z.

"Offset" means that each passage 46 opens in the vicinity of a lateral edge 48 different from the lateral edge 48 in the vicinity of which the passage 46 opens that is defined by the preceding grid 18 or the following grid 18.

In other words, each passage 46 opens opposite a grid 18, and not directly opposite another passage 46.

The grids 18 thus form a set of baffles in the inner space 22, between the granule inlet 24 and the granule outlet 26.

"Baffle" refers to an obstacle diverting the natural movement of a body to impart a winding movement to it.

The grids 18 are suitable for imparting a winding movement to the granules 13 in the chamber 14, and thus extending the distance traveled by each granule 13 between the granule inlet 24 and the granule outlet 26.

Figure 3:
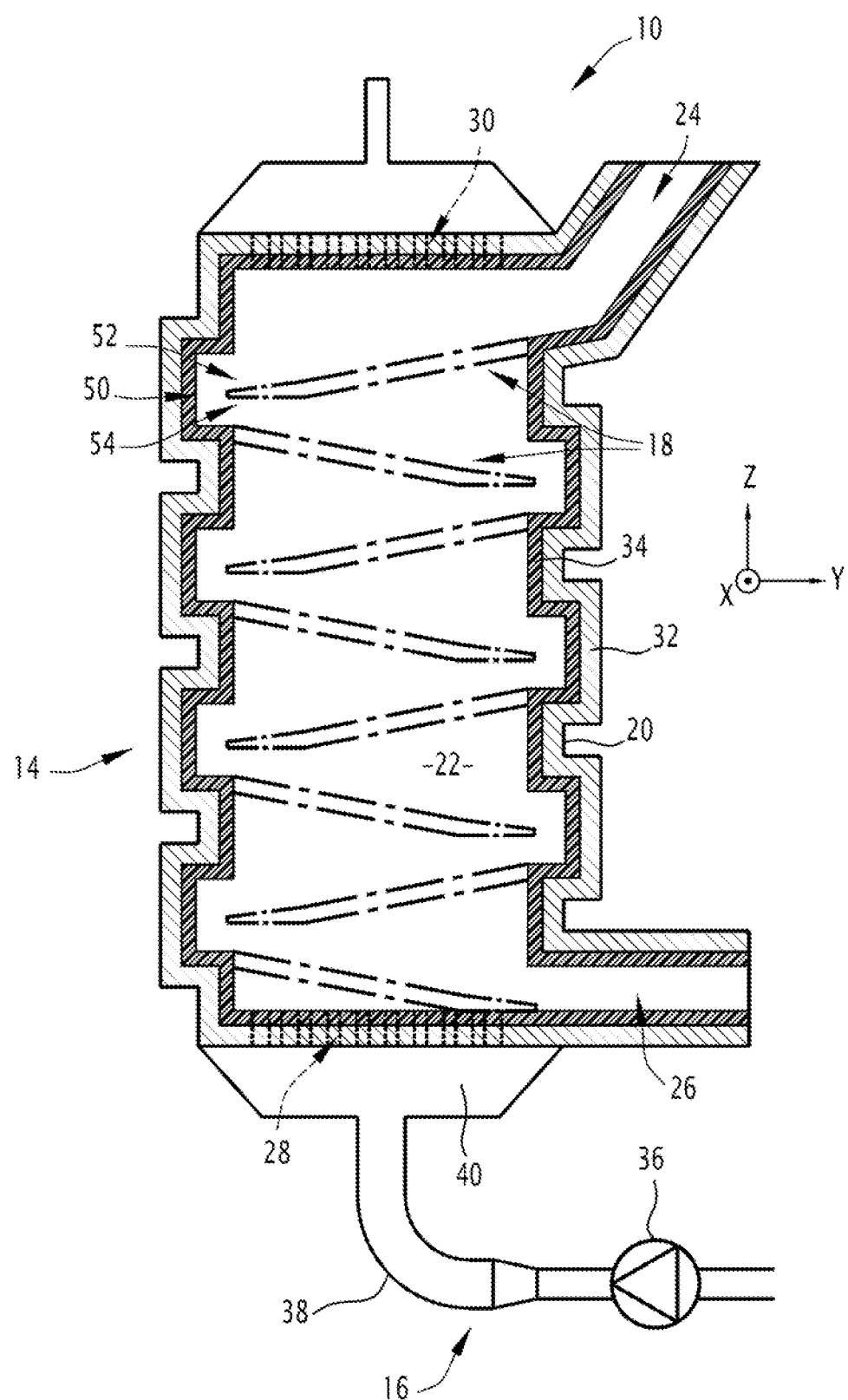
FIG. 3 is a sectional view of a second exemplary charging device.

According to one embodiment shown in FIG. 3, each grid 18 extends through the entire inner space 22, from one lateral edge 48 to the other.

The grids 18 then do not define passages 46.

The chamber 14 comprises ducts 50 passing through the walls 20.

Each duct 50 is suitable for allowing the granules 13 to bypass one of the grids 18.

Each duct 50 comprises a first mouth 52 and a second mouth 54.

The first mouth 52 and the second mouth 54 each emerge through the same lateral edge 48 of the chamber 14.

The first mouth 52 emerges above the grid 18 bypassed by the duct 50, relative to the elevation direction Z.

The second mouth 54 emerges below the grid 18 bypassed by the duct 50, relative to the elevation direction Z.

A method for charging of a mixture 12 of granules 13 of different materials, implementing an electrostatic charging device 10 shown in FIGS. 1 and 2 will now be described.

The method comprises a step for generating an air flow in the inner space of the chamber, by the blowing device.

The method comprises a step for inserting granules 13 in the chamber through the granule inlet 24.

The method comprises a step for forming a fluidized bed by the granules 13 in the chamber 14, under the effect of the air flow.

During the step for forming the fluidized bed, the granules 13 travel the chamber 14 from the granule inlet 24 to the granule outlet 26.

The granules 13 bypass the grids 18 during their travel.

At the same time, the method comprises a step for charging of the granules 13 by triboelectricity. The granules 13 collide with one another and generate surface charges on one another.

The method lastly comprises extracting the granules 13 from the chamber 14 through the granule outlet 26.

The granules 13 travel the chamber 14 from the granule inlet 24 to the granule outlet 26, in a residence time.

An average value of the residence time of the granules 13 is greater than or equal to thirty seconds, in particular greater than or equal to one minute, advantageously greater than or equal to two minutes.

The charging device 10 and the described methods make it possible to charge the mixture 12 of granules 13 effectively, with a continuous supply of granules 13 and a significant residence time.

This makes it possible to obtain an increased surface charge on the granules 13 leaving the device 10, in order to improve the separation.

The device 10 also makes it possible to maintain a significant output owing to the supply by continuous flow.

Lastly, the device 10 retains a reduced footprint and does not require a more powerful blower than a device of the state of the art.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A device for triboelectric charging of a mixture of granules of different materials, the device comprising:
    a charging chamber comprising walls delimiting an inner space, the walls defining a granule inlet and a granule outlet, the granule inlet and the granule outlet being separated from one another relative to an elevation direction,
    a blowing device suitable for generating, in the inner space, an air flow suitable for allowing the granules in the chamber to form a fluidized bed, and
    a plurality of grids positioned in the chamber, the grids being suitable for blocking the passage of the granules, the grids forming a set of baffles in the inner space between the granule inlet and the granule outlet.

2. The device according to claim 1, wherein each grid extends in a plane of extension and has a rectangular shape.

3. The device according to claim 2, wherein the plane of extension of each grid forms an incline angle with the elevation direction, a value of the incline angle being inclusively between −20° and 20°.

4. The device according to claim 3, wherein the value of the incline angle of each grid is opposite the value of the incline angle of each adjacent grid.

5. The device according to claim 1, wherein at least one covering of the walls of the chamber is made with a covering material, the covering material being suitable for charging at least two of the materials of the granules by triboelectric effect.

6. The device according to claim 1, wherein each grid defines a passage in the inner space, each passage being suitable for allowing the passage of the granules, each passage opening near a lateral edge of the chamber.

7. The device according to claim 1, wherein each grid extends through the entire inner space, the chamber comprising ducts passing through the walls, each duct being suitable for allowing the granules to bypass one of the grids.

8. A method for triboelectric charging of a mixture of granules of different materials, the method implementing a device for charging a mixture of granules of different materials, the device comprising:
   a charging chamber comprising walls delimiting an inner space, the walls defining a granule inlet and a granule outlet, the granule inlet and the granule outlet being separated from one another relative to an elevation direction,
   a blowing device suitable for generating, in the inner space, an air flow flowing in the elevation direction, the air flow being suitable for allowing the granules in the chamber to form a fluidized bed, and
   a plurality of grids positioned in the chamber, the grids being suitable for blocking the passage of the granules, the grids forming a set of baffles in the inner space between the granule inlet and the granule outlet,
the method comprising the following steps:
   generating the air flow in the inner space via the blowing device,
   inserting granules in the chamber through the granule inlet,
   having the granules travel through the chamber, in order to obtain charged granules, and
   extracting the charged granules from the chamber through the granule outlet.

9. The method according to claim 8, wherein, during the travel step, an average residence time of the granules in the chamber is greater than or equal to thirty seconds.

10. The method according to claim 8, wherein, during the travel step, an average residence time of the granules in the chamber is greater than or equal to thirty seconds.

11. The method according to claim 8, wherein, during the travel step, an average residence time of the granules in the chamber is greater than or equal to two minutes.

12. A method for separating granules of a mixture of granules of different materials, the method comprising charging the granules by using a device for triboelectric charging,
   the device comprising:
      a charging chamber comprising walls delimiting an inner space, the walls defining a granule inlet and a granule outlet, the granule inlet and the granule outlet being separated from one another relative to an elevation direction,
      a blowing device suitable for generating, in the inner space, an air flow flowing in the elevation direction, the air flow being suitable for allowing the granules in the chamber to form a fluidized bed, and
      a plurality of grids positioned in the chamber, the grids being suitable for blocking the passage of the granules, the grids forming a set of baffles in the inner space between the granule inlet and the granule outlet,
   the materials of the granules being chosen from the group consisting of polypropylene, polystyrene, polyamide, acrylonitrile butadiene styrene and polyethylene.

* * * * *